United States Patent
Noll et al.

(10) Patent No.: US 11,029,992 B2
(45) Date of Patent: Jun. 8, 2021

(54) NONDISRUPTIVE UPDATES IN A NETWORKED COMPUTING ENVIRONMENT

(71) Applicant: International Business Machines Corporation, Armonk, NY (US)

(72) Inventors: Dietmar Noll, Bad Soden-Salm (DE); Patrick Schaefer, Hargesheim (DE); Willi Wuensch, Stadecken-Elsheim (DE)

(73) Assignee: International Business Machines Corporation, Armonk, NY (US)

( * ) Notice: Subject to any disclaimer, the term of this patent is extended or adjusted under 35 U.S.C. 154(b) by 3 days.

(21) Appl. No.: 16/449,533

(22) Filed: Jun. 24, 2019

(65) Prior Publication Data

US 2019/0310875 A1    Oct. 10, 2019

Related U.S. Application Data

(63) Continuation of application No. 15/457,105, filed on Mar. 13, 2017, now Pat. No. 10,394,593.

(51) Int. Cl.
*G06F 9/455* (2018.01)
*G06F 8/65* (2018.01)
*G06F 11/14* (2006.01)

(52) U.S. Cl.
CPC .......... *G06F 9/45558* (2013.01); *G06F 8/65* (2013.01); *G06F 11/1433* (2013.01); *G06F 11/1446* (2013.01); *G06F 2009/45562* (2013.01); *G06F 2009/45575* (2013.01); *G06F 2201/815* (2013.01)

(58) Field of Classification Search
CPC .................................................. G06F 9/45558
See application file for complete search history.

(56) References Cited

U.S. PATENT DOCUMENTS

| | | | |
|---|---|---|---|
| 7,900,005 | B2 | 3/2011 | Kotsovinos et al. |
| 8,151,263 | B1 | 4/2012 | Venkitachalam et al. |
| 8,359,594 | B1 | 1/2013 | Davidson et al. |
| 8,458,688 | B2 | 6/2013 | Ashok et al. |

(Continued)

OTHER PUBLICATIONS

Agarwal et aL, "Live Migration of Virtual Machines in Cloud", International Journal of Scientific and Research Publications, vol. 2, Issue 6, Jun. 2012, 5 pgs.

(Continued)

*Primary Examiner* — Sisley N Kim
(74) *Attorney, Agent, or Firm* — William H. Hartwell; Keohane & D'Alessandro, PLLC; Hunter E. Webb

(57) ABSTRACT

As indicated above, aspects of the present invention provide an approach for facilitating nondisruptive virtual machine (VM) maintenance in a networked computing environment. In an embodiment, a request for an update to an active VM is received, and a copy of the active VM is taken to create a snapshot VM. An update is installed on the snapshot VM. While the snapshot VM is being updated, all changes made to the active VM are saved. Once the update is installed on the snapshot VM, the saved changes are applied to the snapshot VM. A switch is made over to the snapshot VM in real time so that the snapshot VM becomes the active VM. The process allows a user to work continuously with the software as a service (SaaS) VM without disruption.

20 Claims, 6 Drawing Sheets

(56) References Cited

U.S. PATENT DOCUMENTS

| | | |
|---|---|---|
| 8,789,049 B2 | 7/2014 | Hutchins et al. |
| 9,411,621 B2 | 8/2016 | Jeswani et al. |
| 9,459,856 B2 | 10/2016 | Curzi et al. |
| 2010/0275200 A1 | 10/2010 | Radhakrishnan et al. |
| 2012/0102135 A1* | 4/2012 | Srinivasan .......... G06F 11/1438 709/213 |
| 2014/0165060 A1* | 6/2014 | Muller .................. G06F 9/5022 718/1 |
| 2014/0189677 A1 | 7/2014 | Curzi et al. |
| 2015/0177997 A1* | 6/2015 | Warszawski ........ G06F 9/45558 711/162 |
| 2016/0117163 A1* | 4/2016 | Fukui .................. G06F 9/45558 717/171 |
| 2017/0147819 A1* | 5/2017 | Vasilenko ............. G06F 21/554 |
| 2018/0203715 A1 | 7/2018 | Granado |
| 2018/0260237 A1 | 9/2018 | Noll et al. |

OTHER PUBLICATIONS

Kim, Sisley Nahyun, U.S. Appl. No. 15/457,105, Office Action dated Sep. 4, 2018, DE920160234US1, 19 pgs.
Kim, Sisley Nahyun, U.S. Appl. No. 15/457,105, Final Office Action dated Feb. 14, 2019, DE920160234US1, 15 pgs.
Kim, Sisley Nahyun, U.S. Appl. No. 15/457,105, Notice of Allowance dated Apr. 26, 2019, DE920160234US1, 8 pgs.
Appendix P, "List of IBM Patents or Patent Applications Treated as Related", Mar. 31, 2020, 2 pages.

* cited by examiner

NONDISRUPTIVE UPDATES IN A NETWORKED COMPUTING ENVIRONMENT

The present patent document is a continuation of U.S. patent application Ser. No. 15/457,105, filed Mar. 13, 2017, entitled "NONDISRUPTIVE UPDATES IN A NETWORKED COMPUTING ENVIRONMENT", the disclosure of which is incorporated herein by reference.

TECHNICAL FIELD

The subject matter of this invention relates generally to network communications. More specifically, aspects of the present invention provide a solution for facilitating nondisruptive virtual machine (VM) maintenance in a networked computing environment.

BACKGROUND

In an effort to increase efficiency of computing resources, there have been efforts to design "virtual" machines. The concept of virtualization broadly describes the separation of a resource (e.g., computing resource) and/or request for a service from the underlying physical delivery of that service. In one example, with regards to virtual memory, computer software gains access to more memory than is physically installed via the background swapping of data to disk storage. Similarly, virtualization techniques can be applied to other information technology (IT) infrastructure layers such as networks, storage, laptop hardware, server hardware, operating systems, and/or applications.

Through virtualization, the virtual infrastructure provides a layer of abstraction between computing, storage, networking hardware, etc., and the applications running on it and enables a more efficient utilization of computing resources. In general, before virtualization, a single computer is associated with a single operating system image. The machine's hardware and software is tightly coupled, and running multiple applications on the same machine can create conflict. Moreover, the machine is often underutilized and inflexible, which all can lead to an inefficient use of computing resources. In contrast, with virtualization, the operating system and applications are no longer tightly coupled to a particular set of hardware. Advantageously, the virtualized infrastructure allows IT administrators to manage pooled resources across an enterprise, creating a more responsive and dynamic environment.

SUMMARY

In general, aspects of the present invention provide an approach for facilitating nondisruptive virtual machine (VM) maintenance in a networked computing environment. In an embodiment, a request for an update to an active VM is received, and a copy of the active VM is taken to create a snapshot VM. An update is installed on the snapshot VM. While the snapshot VM is being updated, all changes made to the active VM are saved. Once the update is installed on the snapshot VM, the saved changes are applied to the snapshot VM. A switch is made over to the snapshot VM in real time so that the snapshot VM becomes the active VM. The process allows a user to work continuously with the software as a service (SaaS) VM without disruption.

A first aspect of the invention provides a computer-implemented method for facilitating nondisruptive maintenance on a virtual machine (VM) in a networked computing environment, comprising: creating, in response to a receipt of a request to implement an update on an active VM, a copy of the active VM, wherein the copy is a snapshot VM; installing, while saving any incoming changes directed to the active VM to a storage system, the update on the snapshot VM; applying, when the update on the snapshot VM is complete, the saved incoming changes on the snapshot VM; and switching from the active VM to the snapshot VM so the snapshot VM becomes a new active VM and the active VM becomes an inactive VM.

A second aspect of the invention provides a computer program product embodied in a computer readable medium that, when executed by a computer device, performs a method for facilitating nondisruptive maintenance on a virtual machine (VM) in a networked computing environment, the method comprising: creating, in response to a receipt of a request to implement an update on an active VM, a copy of the active VM, wherein the copy is a snapshot VM; installing, while saving all incoming changes directed to the active VM, the update on the snapshot VM; applying, when the update on the snapshot VM is complete, the saved incoming changes on the snapshot VM; and switching from the active VM to the snapshot VM so the snapshot VM becomes a new active VM and the active VM becomes an inactive VM.

A third aspect of the invention provides a system for facilitating nondisruptive maintenance on a virtual machine (VM) in a networked computing environment, comprising: a physical server having an operating system; a plurality of virtual machines running on the physical server; a communications port that connects the physical server to a network; a virtual machine upgrade engine configured to: create, in response to a receipt of a request to implement an update on an active VM, a copy of the active VM, wherein the copy is a snapshot VM; install, while saving all incoming changes directed to the active VM, the update on the snapshot VM; apply, when the update on the snapshot VM is complete, the saved incoming changes on the snapshot VM; and switch from the active VM to the snapshot VM so the snapshot VM becomes a new active VM and the active VM becomes an inactive VM.

Embodiments of the present invention also provide related systems, methods and/or program products.

BRIEF DESCRIPTION OF THE DRAWINGS

These and other features of this invention will be more readily understood from the following detailed description of the various aspects of the invention taken in conjunction with the accompanying drawings in which.

Figure 1:
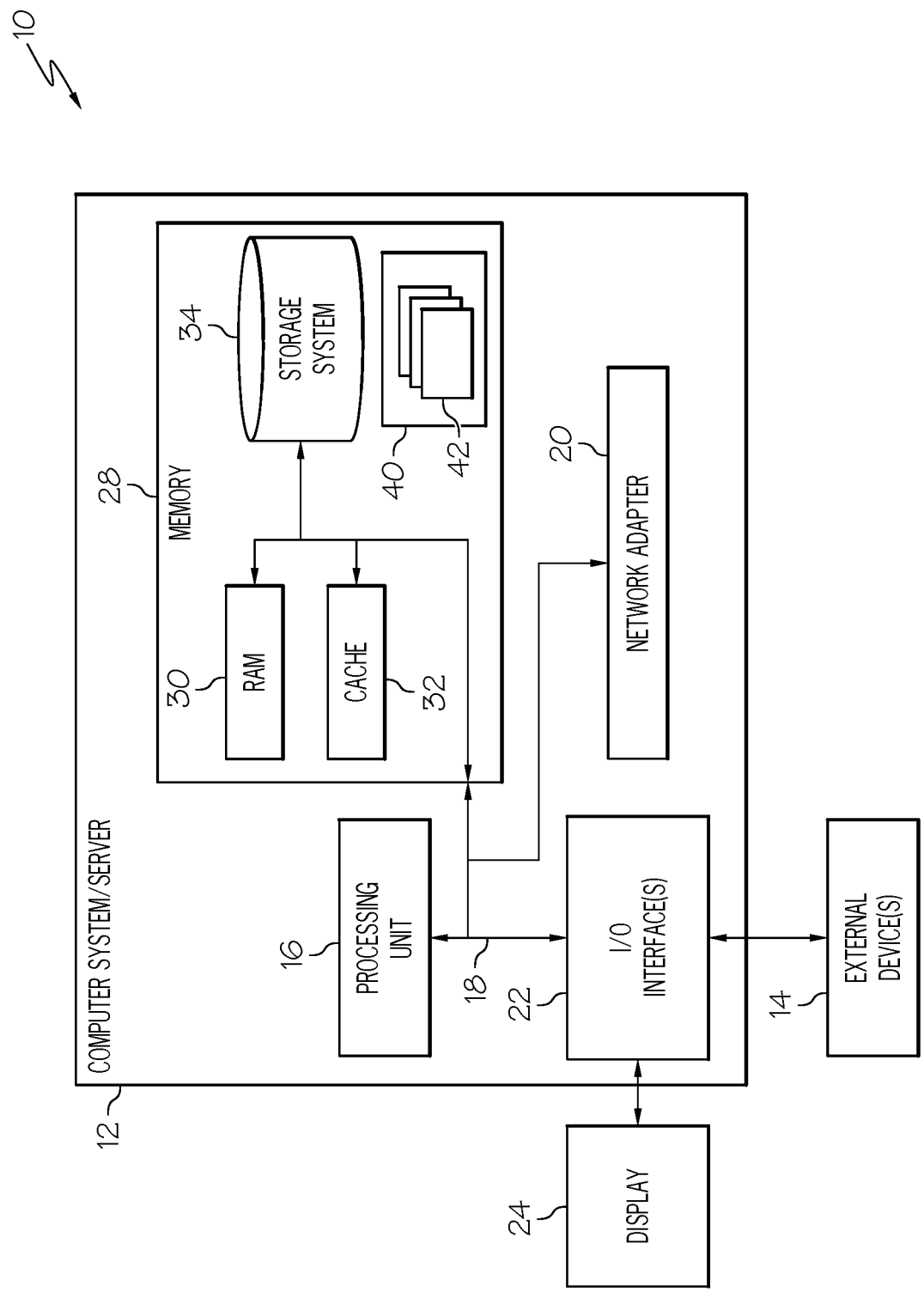
FIG. 1 depicts a cloud computing node according to an embodiment of the present invention.

The drawings are not necessarily to scale. The drawings are merely schematic representations, not intended to portray specific parameters of the invention. The drawings are intended to depict only typical embodiments of the inven-

DETAILED DESCRIPTION

Illustrative embodiments will now be described more fully herein with reference to the accompanying drawings, in which embodiments are shown. This disclosure may, however, be embodied in many different forms and should not be construed as limited to the embodiments set forth herein. Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

As indicated above, aspects of the present invention provide an approach for facilitating nondisruptive virtual machine (VM) maintenance in a networked computing environment. In an embodiment, a request for an update to an active VM is received and a snapshot of an active VM is taken. An update is installed on the snapshot VM. While the snapshot VM is being updated, all changes made to the active VM are saved. Once the update is installed on the snapshot VM, the saved changes are applied to the snapshot VM. A switch is made over to the snapshot VM in real time so that the snapshot VM becomes the active VM. The process allows a user to work continuously with the software as a service (SaaS) VM without disruption.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows. On-demand s elf-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
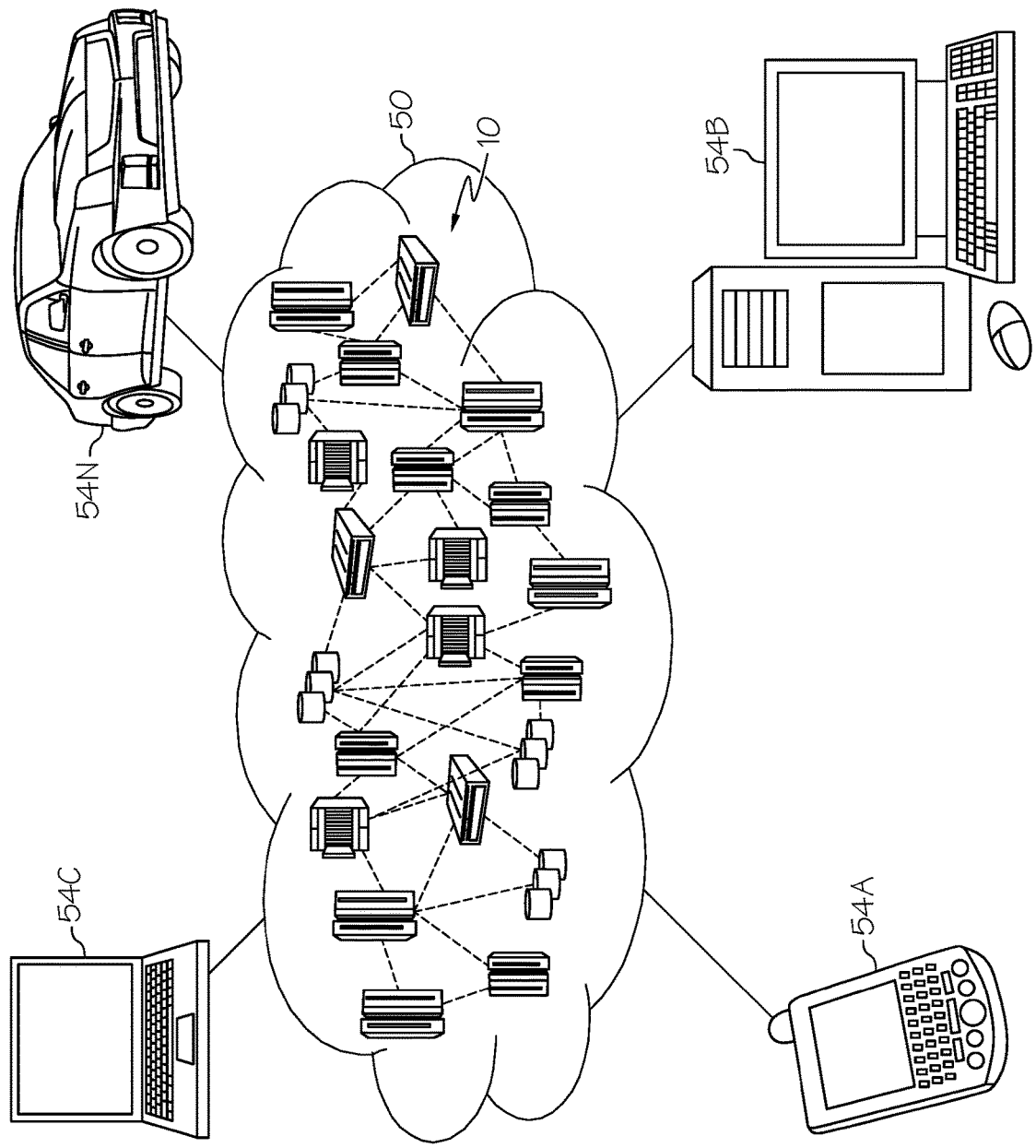
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
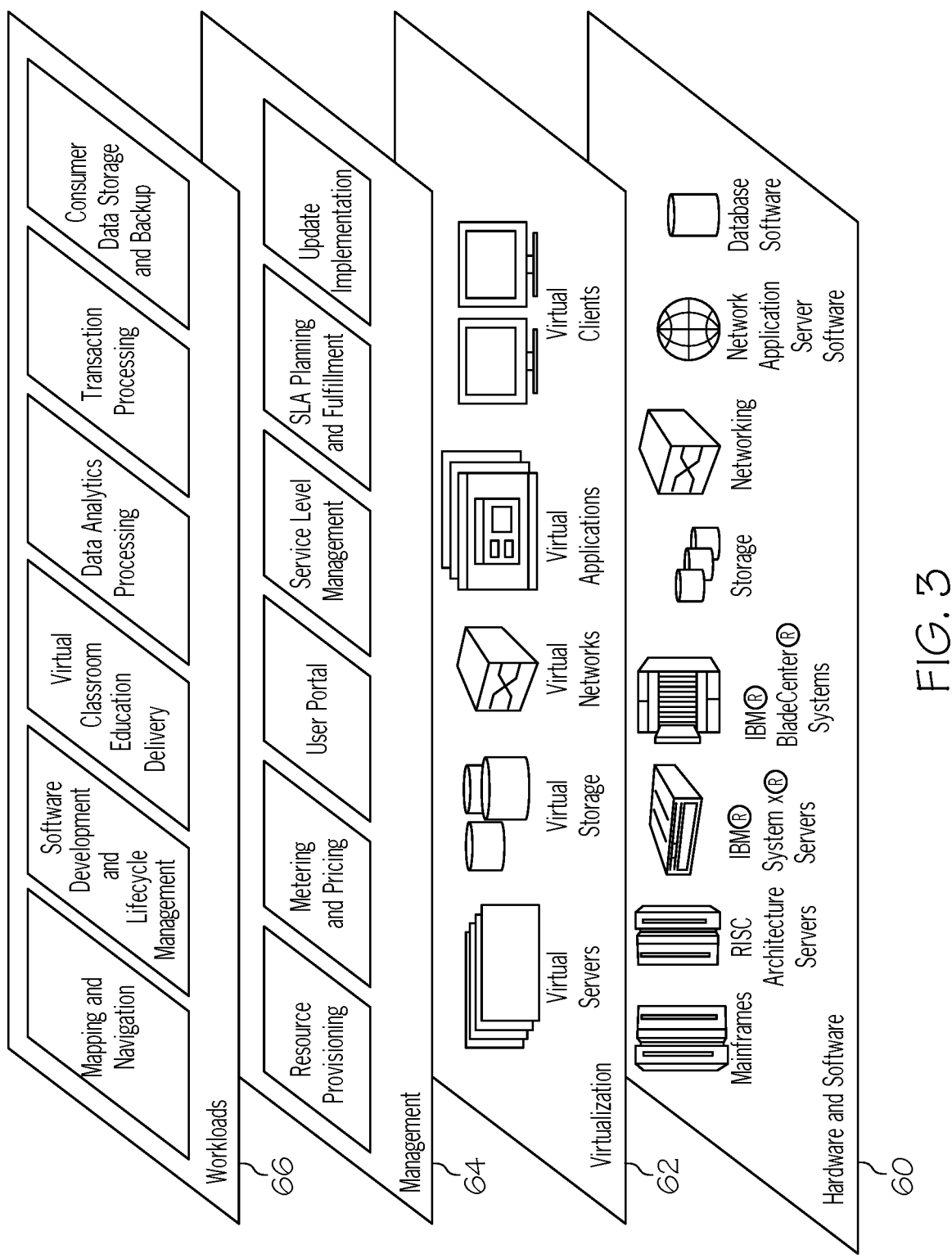
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM System x® servers, IBM BladeCenter® systems, storage devices, networks, and networking components. Examples of software components include network application server software. In one example, IBM WebSphere® application server software and database software. In one example, IBM DB2® database software. (IBM, zSeries, pSeries, System x, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA. Further shown in management layer is update implementation, which represents the functionality that is provided under the embodiments of the present invention.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and consumer data storage and backup. As mentioned above, all of the foregoing examples described with respect to FIG. 3 are illustrative only, and the invention is not limited to these examples.

It is understood that all functions of the present invention as described herein typically may be performed by the command identification functionality (of management layer 64, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

Figure 4:
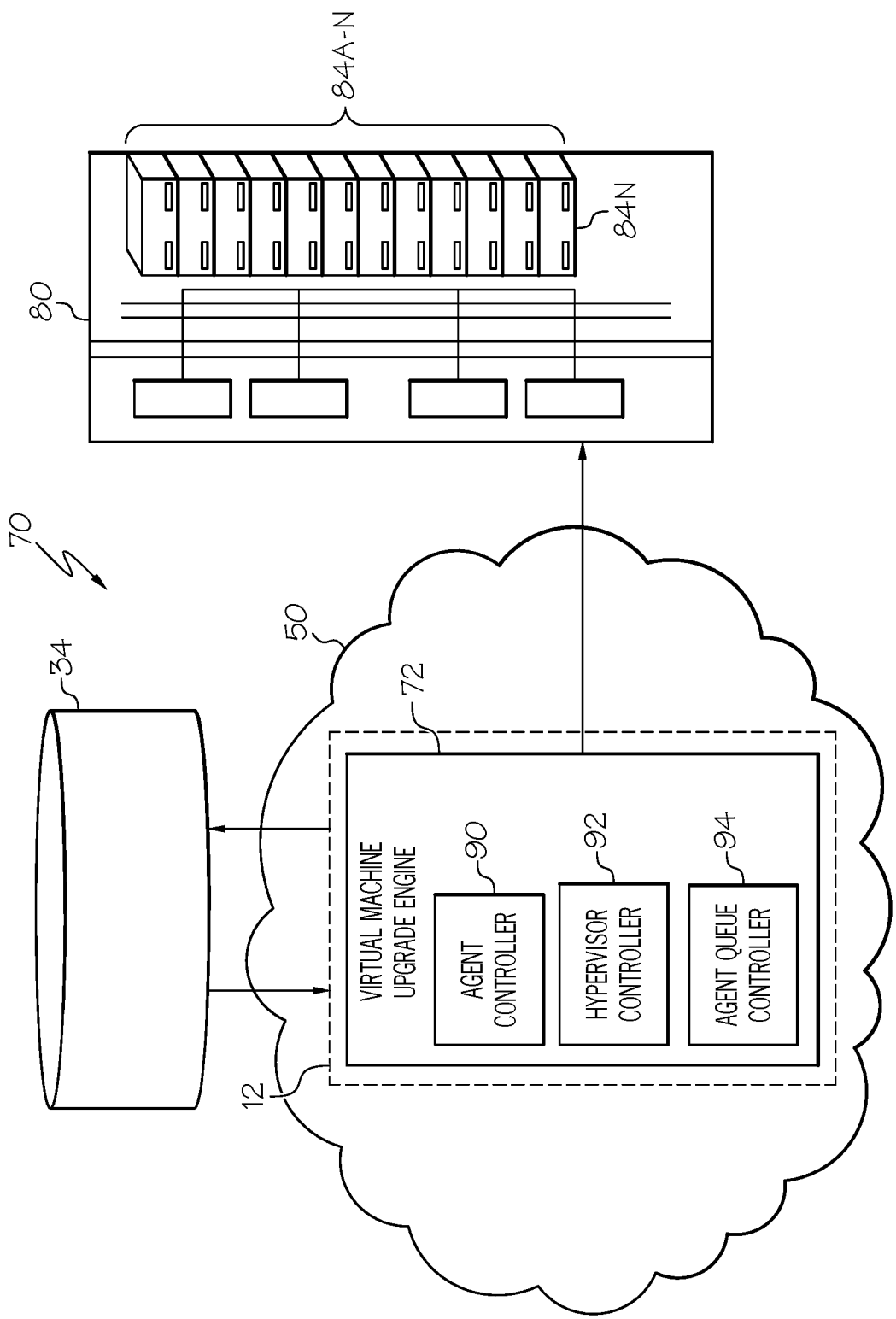
FIG. 4 depicts a system diagram according to an embodiment of the present invention.

Referring now to FIG. 4, a system diagram describing the functionality discussed herein according to an embodiment of the present invention is shown. It is understood that the teachings recited herein may be practiced within any type of networked computing environment 70 (e.g., a cloud computing environment 50). A stand-alone computer system/server 12 is shown in FIG. 4 for illustrative purposes only. In the event the teachings recited herein are practiced in a networked computing environment 70, each physical server 80 need not have a virtual machine upgrade engine (hereinafter "system 72"). Rather, system 72 could be loaded on a server or server-capable device that communicates (e.g., wirelessly) with the physical server 80 to provide SDN communications therefor. Regardless, as depicted, system 72 is shown within computer system/server 12. In general, system 72 can be implemented as program/utility 40 on computer system 12 of FIG. 1 and can enable the functions recited herein. It is further understood that system 72 may be incorporated within or work in conjunction with any type of system that receives, processes, and/or executes commands with respect to IT resources in a networked computing environment. Such other system(s) have not been shown in FIG. 4 for brevity purposes.

Along these lines, system 72 may perform multiple functions similar to a general-purpose computer. Specifically, among other functions, system 72 can facilitate upgrading systems/applications based on VM 84A-N with virtually no interruption of the service provided by the system/application in a networked computing environment 70 by utilizing a snapshot of VM 84A-N. To accomplish this, system 72 can include: an agent controller 90, a hypervisor controller 92, and an agent queue controller 94.

Figure 5:
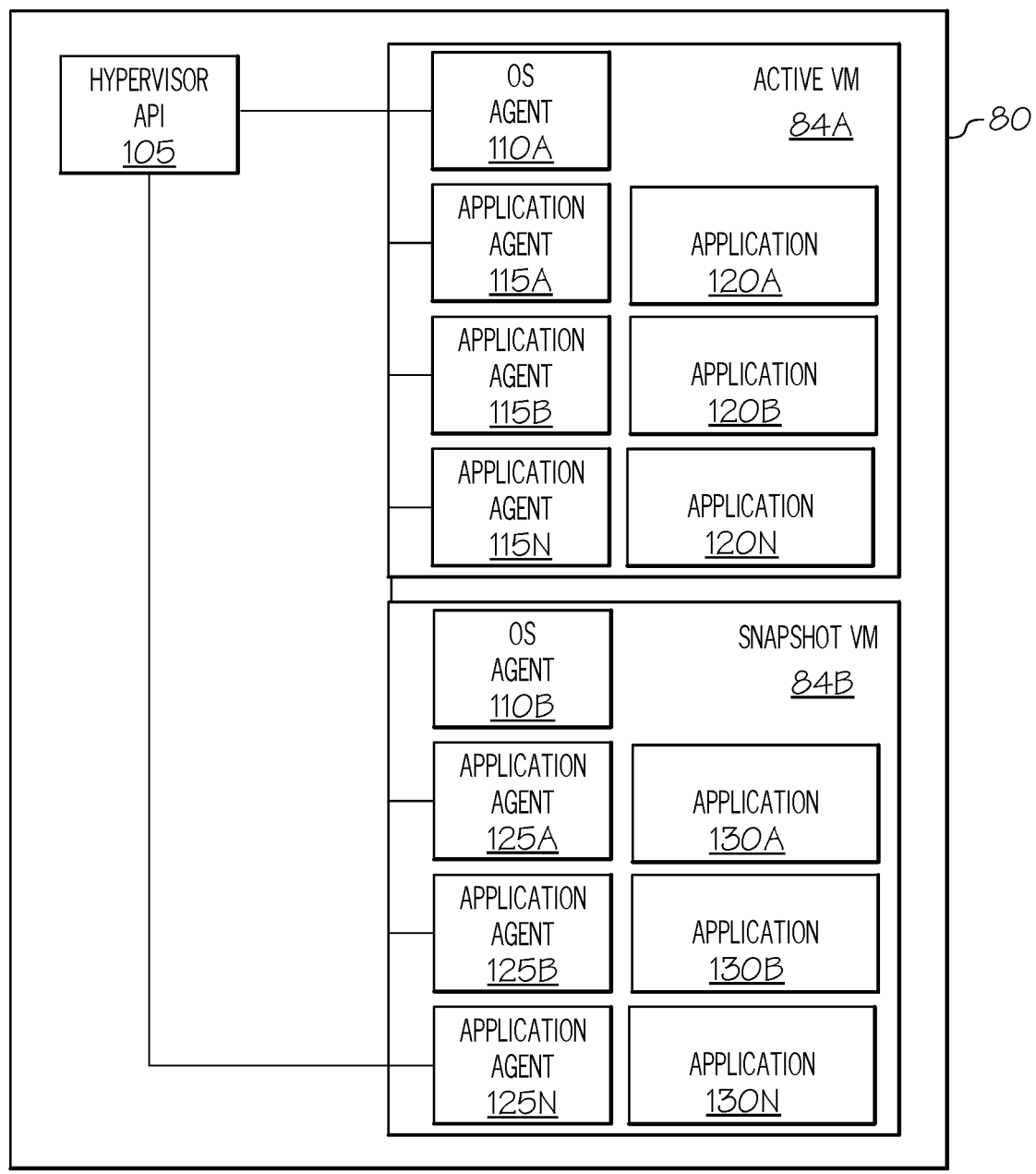
FIG. 5 depicts a detailed view of an active virtual machine and a snapshot virtual machine according to an embodiment of the present invention.

FIG. 5 shows a detailed view of active VM 84A and snapshot VM 84B on physical server 80. Snapshot VM 84B is a snapshot or copy of active VM 84A. The snapshot preserves the complete state of active VM 84A. As shown, physical server 80 includes hypervisor application program interface (API) 105. Hypervisor API 105 can run directly on the physical server 80, referred to as a bare metal (BM) configuration, or, alternatively, can run on a server operating system running on the physical server 80. In any case, hypervisor API 105 provides a platform that allows multiple "guest" virtual server 84 systems to run concurrently on the physical server 80. To this extent, hypervisor API 105 provides an abstraction level between the hardware level of physical server 80 and the higher level software functions of each virtual server 84A-N.

Active VM 84A includes operating system (OS) agent 110A, application agent 115A-N, and application 120A-N. Each application has its own agent. Typically, an agent can start the application, stop the application, and monitor its status. Secondary VM 84B includes operating system (OS) agent 110B, application agent 125A-N, and application 130A-N. As discussed, snapshot VM 84B is a snapshot or exact copy of VM 84A. In an embodiment, snapshot VM 84B can be created using a backup tool. As such, OS agent 110B is a snapshot of OS agent 110A, application agent 125A-N is a snapshot of agent 115A-N, and application 130A-N is a snapshot of application 120A-N.

In certain embodiments, an advantage of this approach is its reduction in computing downtown required when performing maintenance on VMs 84A-N in a networked computing environment 70. One of the often seen problems in operating an information technology (IT) infrastructure is the downtime required to upgrade running systems to a newer version of the operating system and/or application or to apply security patches. While there are a number of ways to reduce the downtime as much as possible, there are still some situations where it is not possible to upgrade while still running the system/application. To this extent, in the current invention as illustrated in FIGS. 4 and 5, system 72, as executed by computer system/server 12, is configured to provide a seamless way for performing maintenance on VMs 84A-N in the background in such a way that the user of VMs 84A-N is not disrupted when a user is actively working with it. The maintenance process is transparent to the user.

Reduction of computing downtime by providing a seamless maintenance approach increases user efficiency and productivity by allowing a user to continue working without disruption and delay. In certain instances, downtime can also be costly to an organization both in terms of revenue loss and damage to the organization's brand and reputation.

It should be understood that VMs 84A-N are different from a process virtual machine. A process virtual machine is a platform dependent engine, such as a Java® Virtual Machine, that executes platform independent code written in a high-level programming language, such as Java, for performing a specific task (Java and Java Virtual Machine are trademarks of Oracle and/or its affiliates in the United States and/or elsewhere). In contrast, the VMs 84A-N of the current invention are each virtual systems that can simulate an entire computing environment. To this extent, rather than performing only a single task, the VMs of the current invention can be environments within which a variety of tasks, functions, operations, etc., can be carried out by a user, such as by executing one or more applications and/or managed services thereon. As such, a plurality of VMs 84A-N can operate independently on a single physical server 80, while each of VMs 84A-N can be made to simulate a stand-alone computer system in the eyes of a user.

Although the disclosure focuses on an application update (e.g., version upgrade, security patch, etc.) for brevity purposes, the system and methods discussed herein can also apply to facilitating an operating system update. To that end, operating system agents 110A, 1106 would perform the functions of application agents 115A-N and 125A-N, respectively.

Referring again to FIG. 4, agent controller 90 of system 72, as executed by computer system/server 12, is configured to manage application agents 115A-N. Generally, an agent controller is a daemon that allows client applications to launch and manage local or remote applications and provides information about running applications to other applications. To that extent, agent controller 90 determines whether application agents 115A-N are already deployed on active VM 84A when a request for an update is received. If not, application agents 115A-N is deployed. If application agents 115A-N is already deployed, agent controller 90 ensures application agents 115A-N has the latest version. If application agents 115A-N does not have the latest version, application agents 115A-N may be updated automatically or an update notification (e.g., via a display, log file, etc.) may be provided to a user. Each application 120A-N will have its own application agents 115A-N. Application agents 115A-N plugs into applications 120A-N, meaning that it connects to applications 120A-N via an application API.

Essentially, application agents 115A-N has two functions. Firstly, it executes actions on applications 120A-N and, secondly, it records each action. In an embodiment, application agents 115A-N may only record actions that initiate changes to applications 120A-N. For example, only actions that change a table structure or update data in a table may be recorded for a database application. An action such as executing a 'SELECT' statement which just reads data from a database may not be recorded.

After application agents 115A-N is deployed, application controller 90 informs application agents 115A-N to begin recording incoming requests related to applications 120A-N to a storage system. In some instances, application agents 115A-N may not start on its own. In an embodiment, all actions that are being recorded are written to one or more first-in-first-out (FIFO) queues. For example, each application agent 115A-N may have its own queue. In an embodiment, the FIFO queues are located on agent queue controller 94 of system 72. In another embodiment, the queues may be located on active VM 84A based on available storage space. After applications 120A-N has application agents 115A-N plugged in and agents 115A-N have begun recording, agent controller 90 suspends the execution of actions on applications 120A-N on active VM 84A because snapshot VM 84B will be created. However, the action requests are still being written to the queue. The suspension ensures actions will not be contained twice in applications 130A-N on snapshot VM 84B. First, because snapshot VM 84B will contain all changes to active VM 84B prior to the suspension and, second, from later execution of actions stored in the queues.

Hypervisor controller 92 of system 72, as executed by computer system/server 12, is configured to create snapshot VM 84B from active VM 84A. Snapshot VM 84B has a temporary internet protocol (IP) address as long as active VM 84A is running. Later, after switching over to snapshot VM 84B, snapshot VM 84B will obtain the IP address active VM 84A. Hypervisor controller 82 is further configured to manage the IP addresses of active VM 84A and snapshot VM 84B. The suspension lasts until snapshot VM 84B has been created. After the creation of snapshot VM 84B, application controller 90 is further configured to inform application agent 120A-N on active VM 84A to continue with the execution of actions.

Agent queue controller 94 of system 72, as executed by computer system/server 12, is configured to ensure the actions that were recorded during the suspension are executed on active VM 84A. To accomplish this task, a mechanism that counts each reference to an element may be used. To that end, if an element needs to be executed on both active VM 84A and snapshot VM 84B, then the reference count equals 2. When the reference count is 0, the element can be deleted from the respective queue. In an embodiment, a single queue for element reference counts is used. In another embodiment, more than one queue may be used. For example, three queues may be used: one for actions that will be transferred from active VM 84A to snapshot VM 84B (see FIFO queue description above), one for active VM 84A that stores the actions during suspension when snapshot VM 84B is being created, and one for snapshot VM 84B that stores the actions when hypervisor controller 92 switches from active VM 84A to snapshot VM 84B.

As mentioned above, after snapshot VM 84B creation, all actions are executed again and recorded on active VM 84A. On snapshot VM 84B, all necessary updates, fix packs, etc., will be installed. In an embodiment, OS agent 110B is responsible for making the updates on snapshot VM 84B. In another embodiment, application agents 125A-N has the responsibility. In yet another embodiment, a software distribution system could perform the work.

When snapshot VM 84B is completely set up, application controller 90 informs application agents 125A-N on snapshot VM 84B to read out the corresponding queues and execute all actions stored in the queues. This means that for a short period of time, active VM 84A and snapshot VM 84B run in parallel and are in sync. Application agents 115A-N on active VM 84A writes data to the queues and application agents 125A-N on snapshot VM 84B reads from those queues.

At this point, application controller 90 completely suspends application agents 115A-N on active VM 84A and hypervisor controller 92 switches from active VM 84A to snapshot VM 84B so that snapshot VM 84B becomes the new active VM. To that end, the IP address for active VM 84A is assigned to snapshot VM 84B to bring about the VM switch. All external services (e.g., keyboard, mouse, web clients, etc.) are now routed to the new active VM (i.e., formerly snapshot VM 84B). In an embodiment, agent controller 90 is further configured to remove application agents 125A-N from snapshot VM 84B. The original active VM 84A can now be deleted.

Figure 6:
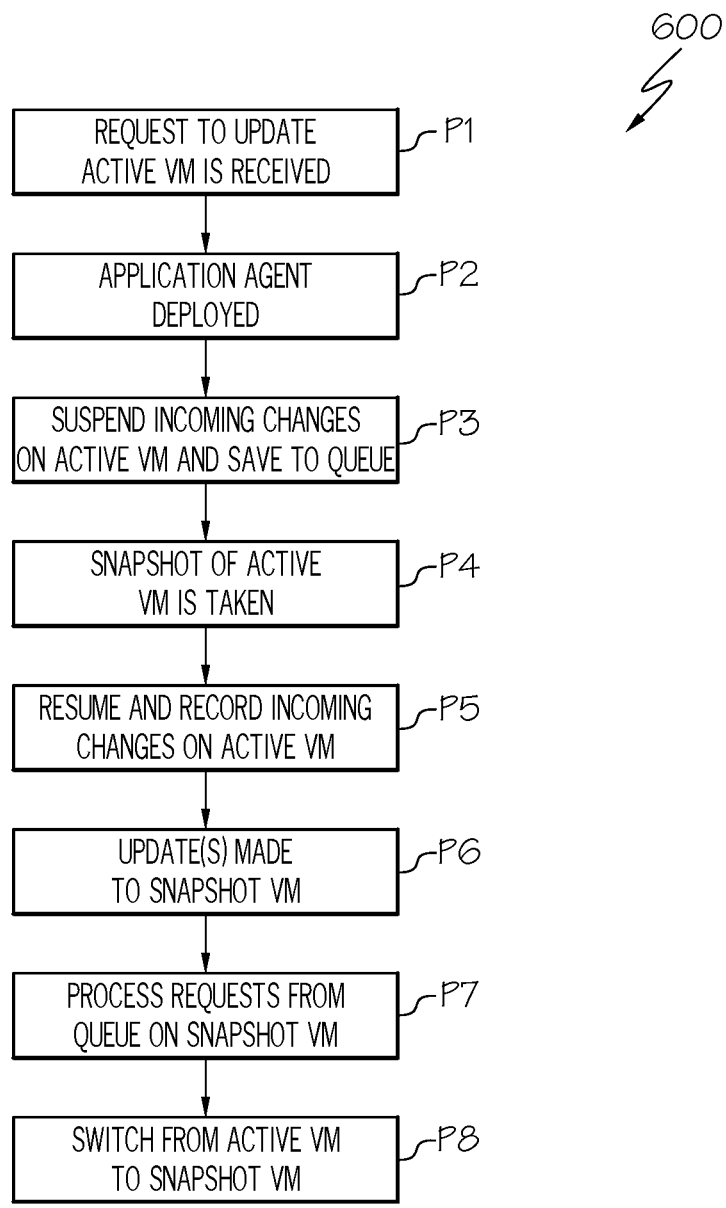
FIG. 6 depicts an example process flow according to an embodiment of the present invention.

Referring now to FIG. 6 in conjunction with FIG. 4, a method flow diagram 600 according to an embodiment of the present invention is shown. The functions of system 72 will be described with reference to the following scenario. Assume an example in which a user is working with a web browser (i.e., web client) that connects to a web server which is running on active VM 84A. The web service (e.g., application 120A) is using representational state transfer (REST). REST is the underlying architectural principle of the web. With the web, clients (browsers) and servers can interact in complex ways without the client knowing anything beforehand about the server and the resources it hosts. The key constraint is that the server and client must both agree on the media used, which, in the case of the web, is HyperText Markup Language (HTML). An API that adheres to the principles of REST does not require the client to know anything about the structure of the API. Rather, the server needs to provide whatever information the client needs to interact with the service.

Hypertext Transfer Protocol (HTTP) is the foundation of data communication for the web. HTTP is oriented around verbs and resources. The two verbs in mainstream usage are GET and POST. However, the HTTP standard defines several others such as PUT and DELETE. These verbs are then applied to resources, according to the instructions provided by the server.

At P1, a request to implement an update to active VM 84A is received. REST uses the following 4 HTTP methods: (1) POST to create a resource on the server, (2) GET to retrieve a resource, (3) PUT to change the state of a resource or to update it, and (4) DELETE to remove or delete a resource. Only POST, PUT, and DELETE will be recorded by application agent 115A since they initiate changes on the web server side. GET is a method that just reads data and therefore does not need to be recorded.

At P2, while a user continues working with the web client, agent controller 90 of system 72, as executed by computer/server 12, deploys application agent 115A for the web service on active VM 84A. To be able to record the incoming requests from the web client, application agent 115A is designed to be a servlet filter. Since Java EE 6, it is possible to dynamically register a filter with a servlet. A servlet filter is an object that can intercept HTTP requests targeted at application 120A. As soon as application agent 115A has registered itself with the servlet, it passes through all incoming HTTP requests to the next filter in the chain and writes all POST, PUT and DELETE requests to a FIFO queue.

Before a snapshot of active VM 84A is taken, at P3, agent controller 90 suspends the execution of changes (i.e., incoming HTTP changes) to application 120A on active VM 84A. Incoming changes are solely written to the queue. At P4, hypervisor controller 92 of system 72, as executed by computer system/server 12, creates snapshot VM 84B from active VM 84A. Snapshot VM 84B has a temporary internet protocol (IP) address as long as active VM 84A is running. At P5, application controller 90 informs application agent 120A to continue with the execution of actions by ending the suspension of incoming HTTP changes on the active VM 84A. Incoming changes are still written to the queue. At P6, the necessary updates are made on the snapshot VM 84B. After the updates are made, at P7, agent controller 90 informs application agent 125A on snapshot VM 84B to connect to the queue. Application agent 125A reads the queue out and passes all HTTP changes to application 130A for processing on snapshot VM 84B.

For a short period of time, active VMA and snapshot VM 84B run in parallel and are in sync. At P8, hypervisor controller 90 switches over from active VM 84A to snapshot VM 84B. The web client is now connected to snapshot VM 84B. Snapshot VM 84B becomes the new active VM, and all HTTP requests are now being handled on the new active VM (i.e., formerly snapshot VM 84B) and the former active VM 84A becomes inactive. Agent controller 90 removes application agent 120A from snapshot VM 84B. The inactive VM (i.e., active VM 84A) can now be deleted.

The flow diagram of FIG. 6 illustrates the architecture, functionality, and operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order depicted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

While shown and described herein as an approach for facilitating nondisruptive virtual machine (VM) maintenance in a networked computing environment, it is understood that the invention further provides various alternative embodiments. For example, in one embodiment, the invention provides a method that performs the process of the invention on a subscription, advertising, and/or fee basis. That is, a service provider, such as a Solution Integrator, could offer to provide functionality for facilitating nondisruptive VM maintenance in a networked computing environment. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In another embodiment, the invention provides a computer-implemented method for facilitating nondisruptive virtual machine (VM) maintenance in a networked computing environment. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, availability detector 118 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may also be a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It is apparent that there has been provided approaches for responding to a threat in a networked computing environment. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A computer-implemented method for facilitating non-disruptive maintenance on a virtual machine (VM) in a networked computing environment, comprising:
   creating, in response to a receipt of a request to implement an update on an active VM, a copy of the active VM, wherein the copy is a snapshot VM;
   installing, while saving any incoming changes directed to the active VM to a storage system, the update on the snapshot VM;
   applying, when the update on the snapshot VM is complete, the saved incoming changes on the snapshot VM until the saved incoming changes are completely applied to the snapshot VM such that the active VM and the snapshot VM are running in parallel; and
   switching, in response to the active VM and the snapshot VM running in parallel, from the active VM to the snapshot VM so the snapshot VM becomes a new active VM and the active VM becomes an inactive VM.

2. The computer-implemented method of claim 1, wherein the saving includes applying a reference count that indicates that the incoming change needs to be executed on both the active VM and the snapshot VM.

3. The computer-implemented method of claim 1, wherein switching includes assigning the internet protocol (IP) address of the active VM to the snapshot VM.

4. The computer-implemented method of claim 1, further comprising deleting the inactive VM.

5. The computer-implemented method of claim 1, wherein the update is associated with an application or an operating system on the active VM.

6. The computer-implemented method of claim 1, wherein the update is selected from a group consisting of a version upgrade and a security patch.

7. The computer-implemented method of claim 1, further comprising suspending any agents on the active VM prior to switching from the active VM to the snapshot VM.

8. A computer program product embodied in a computer readable medium that, when executed by a computer device, performs a method for facilitating nondisruptive maintenance on a virtual machine (VM) in a networked computing environment, the method comprising:
   creating, in response to a receipt of a request to implement an update on an active VM, a copy of the active VM, wherein the copy is a snapshot VM;

installing, while saving all incoming changes directed to the active VM, the update on the snapshot VM;

applying, when the update on the snapshot VM is complete, the saved incoming changes on the snapshot VM until the saved incoming changes are completely applied to the snapshot VM such that the active VM and the snapshot VM are running in parallel; and switching, in response to the active VM and the snapshot VM running in parallel, from the active VM to the snapshot VM so the snapshot VM becomes a new active VM and the active VM becomes an inactive VM.

9. The computer program product of claim 8, wherein the saving includes applying a reference count that indicates that the incoming change needs to be executed on both the active VM and the snapshot VM.

10. The computer program product of claim 8, wherein switching includes assigning the internet protocol (IP) address of the active VM to the snapshot VM.

11. The computer program product of claim 8, the method further comprising deleting the inactive VM.

12. The computer program product of claim 8, wherein the update is associated with an application or an operating system on the active VM.

13. The computer program product of claim 8, wherein the update is selected from a group consisting of a version upgrade and a security patch.

14. The computer program product of claim 8, the method further comprising suspending any agents on the active VM prior to switching.

15. A system for facilitating nondisruptive maintenance on a virtual machine (VM) in a networked computing environment, comprising:
   a physical server having an operating system;
   a plurality of virtual machines running on the physical server;
   a communications port that connects the physical server to a network;
   a virtual machine upgrade engine, configured to:
      create, in response to a receipt of a request to implement an update on an active VM, a copy of the active VM, wherein the copy is a snapshot VM;
      install, while saving all incoming changes directed to the active VM, the update on the snapshot VM;
      apply, when the update on the snapshot VM is complete, the saved incoming changes on the snapshot VM until the saved incoming changes are completely applied to the snapshot VM such that the active VM and the snapshot VM are running in parallel; and
      switch, in response to the active VM and the snapshot VM running in parallel, from the active VM to the snapshot VM so the snapshot VM becomes a new active VM and the active VM becomes an inactive VM.

16. The system of claim 15, wherein the saving includes applying a reference count that indicates that the incoming change needs to be executed on both the active VM and the snapshot VM.

17. The system of claim 15, wherein switching includes assigning the internet protocol (IP) address of the active VM to the snapshot VM.

18. The system of claim 15, further comprising deleting the inactive VM.

19. The system of claim 15, wherein the update is associated with an application or an operating system on the active VM.

20. The system of claim 15, wherein the update is selected from a group consisting of a version upgrade and a security patch.

* * * * *